United States Patent [19]

Turek

[11] Patent Number: 5,575,980
[45] Date of Patent: Nov. 19, 1996

[54] VALVED RADIAL FLOW CATALYTIC CONVERTER

[75] Inventor: Alan G. Turek, Mayville, Mich.

[73] Assignee: General Motors Corporation, Detroit, Mich.

[21] Appl. No.: 515,075

[22] Filed: Aug. 14, 1995

[51] Int. Cl.⁶ .............................. B01D 53/34; F01N 3/10
[52] U.S. Cl. .................... 422/181; 422/171; 422/176; 422/177; 422/180; 422/211; 422/218; 422/222; 60/299; 55/DIG. 30
[58] Field of Search .................................. 422/177, 176, 422/179, 171, 180, 211, 218, 222, 181; 502/439, 527; 55/DIG. 30; 60/299, 297

[56] References Cited

U.S. PATENT DOCUMENTS

| 3,535,066 | 10/1970 | Wagner | 48/192 |
| 3,811,845 | 5/1974 | Nakamura | 422/181 |
| 4,383,974 | 5/1983 | Fratzer et al. | 422/180 |
| 4,559,205 | 12/1985 | Hood | 422/180 |
| 4,619,912 | 10/1986 | Jalbing et al. | 502/439 |
| 5,187,142 | 2/1993 | Foster et al. | 502/439 |
| 5,315,824 | 5/1994 | Takeshima | 60/297 |

FOREIGN PATENT DOCUMENTS

0514326A1  11/1992  European Pat. Off. .

OTHER PUBLICATIONS

"Radial Inflow Catalytic Converter More Efficient", Ward's Engine & Vehicle Technology Update—Jun. 15, 1994.

Primary Examiner—Robert J. Warden
Assistant Examiner—Hien Tran
Attorney, Agent, or Firm—Cary W. Brooks

[57] ABSTRACT

A catalytic converter selectively controllable between a radial flow mode, wherein exhaust gas is caused to radially flow across the catalyst thereof, and a by-pass mode, wherein exhaust gas passes axially therethrough. The catalytic converter includes a selectively perforated tube, a catalytic monolith composed of a series of alternating herringbone corrugation patterned foil sheets having a noble (precious) metal catalytic material applied to the surface thereof wherein each of the foil sheets has a central hole whereat is situated the tube, a valve for selectively occluding the tube, and a clam-shell enclosure. The herringbone corrugation pattern provides a plurality of radial passageways. When the valve is in its closed position the tube is in a closed state, wherein the exhaust gas entering the tube upstream of the catalytic monolith is caused to pass through the passageways until emerging at the outer periphery of the catalytic monolith. The enclosure captures the emerging exhaust gas, which travels between the enclosure and the outer periphery of the catalytic monolith and thereupon enters a snorkel space downstream of both the catalytic monolith and the valve, whereupon the exhaust gas re-enters the tube.

20 Claims, 3 Drawing Sheets

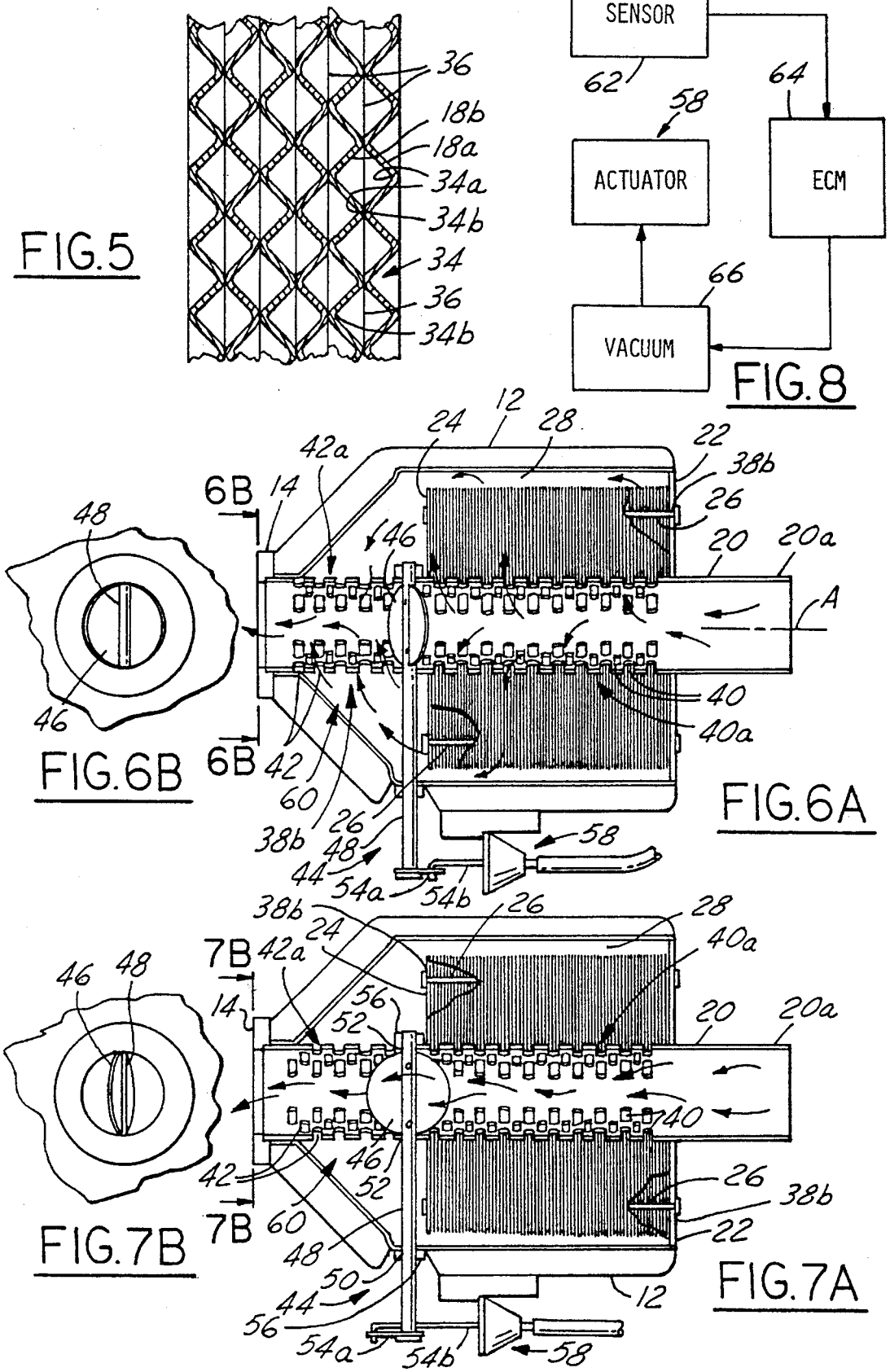

VALVED RADIAL FLOW CATALYTIC CONVERTER

BACKGROUND OF THE INVENTION

1. Field of the Invention

The present invention is related to catalytic converters for catalytically reacting with exhaust gas of internal combustion engines, and more particularly to a warm-up catalytic converter for use during initial engine operation. Still more particularly, the present invention is related to a catalytic converter having an axial flow mode and a radial flow mode and a valve for selectively switching exhaust gas flow from the radial flow mode to the axial flow mode, wherein catalytic reaction of exhaust gas occurs during the radial flow mode.

2. Description of the Related Art

Because harmful pollutants are contained in the exhaust gas of internal combustion engines, such as carbon monoxide, nitrous oxides and unburned hydrocarbons, catalytic converters are widely used to catalytically react with the exhaust gas to thereby greatly reduce pollutant emissions. Problematically, however, the noble metal catalyst of the catalytic converter must be raised to a minimum operational temperature, the "light-off" temperature, in order for the exhaust gas pollutants to be catalytically reacted at maximum efficiency.

In vehicular applications, the catalytic converter is usually located relatively far downstream of the engine under the vehicle floor. Accordingly, when the engine is cold started and the exhaust gas is relatively cool, the catalytic converter will operate at reduced efficiency until the exhaust gas becomes hot enough for the catalyst to achieve its light-off temperature. During this time of initial engine operation, considerable pollutant output can occur.

In order to raise the catalytic converter to its light-off temperature as quickly as possible, supplemental heat systems can be utilized. Supplemental heat systems generally are of two types, electrical and gas fired. Electrical type supplemental heat systems require a large current for providing sufficient heat which tends to tax the electrical system of the vehicle, and there is a potential problem associated with shorting of the electrical path due to insulator failure. Gas fired type supplemental heat systems require an auxiliary burner unit interfaced with the exhaust system upstream of the catalytic converter, and the dual goals of efficient operation and minimal mechanical complexity are difficult to achieve in practice.

Accordingly, it would be beneficial if a warm-up catalytic converter could be provided immediately adjacent to the exhaust manifold which would efficiently operate during the initial period of engine operation and wherein the operation thereof would be selectively controllable.

SUMMARY OF THE INVENTION

The present invention is a warm-up catalytic converter for being located immediately adjacent to the exhaust manifold having an internal configuration that provides for efficient operation during the initial period of engine operation, wherein the operation thereof is selectively controllable between a radial flow mode, wherein exhaust gas is caused to radially flow across the catalyst thereof, and a by-pass mode, wherein exhaust gas passes axially therethrough.

The warm-up catalytic converter according to the present invention includes, briefly, a selectively perforated tube, a catalytic monolith composed of a series of alternating herringbone corrugation patterned foil sheets having a noble (precious) metal catalytic material applied to the surface thereof, wherein each of the foil sheets has a central hole whereat is situated the tube, a valve for selectively occluding the tube, and a clam-shell enclosure.

The tube is provided with a plurality of perforations in the form of two sets of staggered slots. The foil sheets of the catalytic monolith are provided with the aforesaid herringbone corrugation pattern, an outer periphery having a selected shape and the aforesaid central hole. About the periphery of the central hole, a plurality of notches is provided. The foil sheets are alternatingly reversed so that the peak of each herringbone obliquely crosses each other peak among abutting foil sheets. The spaces formed between the herringbone peaks provides a plurality of passageways. The tube is situated in the central hole of the monolith, wherein the first set of staggered slots communicates therewith, in particular the plurality of notches thereof. In this regard, catalytic reactions of exhaust gas occurs in those passageways which extend between the central hole and the outer periphery and which fluidically communicate with the first set of slots.

A valve is situated in the tube downstream of the catalytic monolith. When the valve is in its closed position the tube is in a closed state, wherein the exhaust gas entering the tube upstream of the catalytic monolith is caused to pass through the first set of staggered slots, through the notches, and along the passageways until emerging at the outer periphery of the catalytic monolith. It will be noted that the passageways are oriented radially with respect to the cylindrical axis of the tube. The clam-shell enclosure captures the emerging exhaust gas.

The emerged exhaust gas travels in an outer passage provided between the enclosure and the outer periphery of the catalytic monolith and thereupon enters a snorkel space downstream of both the catalytic monolith and the valve, whereupon the exhaust gas encounters the second set of staggered slots of the tube. The exhaust gas thereupon passes through the second set of staggered slots, passes along the tube into the downstream exhaust system pipe and thereafter encounters the main catalytic converter of the exhaust system.

When the temperature of the exhaust gas is sufficiently hot so that the main catalytic converter of the exhaust system is at, or near, its light-off temperature, the valve is moved to its open position wherein the tube is in an open state, whereupon exhaust gas passes axially through the tube, by-passing the passageways.

Accordingly, it is an object of the present invention to provide a warm-up catalytic converter which is selectively switchable between catalytic operation and non-catalytic operation.

It is an additional object of the present invention to provide a warm-up catalytic converter which has radial exhaust gas flow when catalytically operating and has axial exhaust gas flow when not catalytically operating.

It is another object of the present invention to provide a warm-up catalytic converter which has radial exhaust gas flow when catalytically operating and has axial exhaust gas flow when not catalytically operating, wherein radial flow is provided by a plurality of passageways formed by a plurality of herringbone corrugation patterned foil sheets which are alternatingly reversed.

It is yet a further object of the present invention to provide a warm-up catalytic converter which has radial exhaust gas flow when catalytically operating and has axial exhaust gas flow when not catalytically operating, wherein exhaust noise attenuation is provided thereby.

These, and additional objects, advantages, features and benefits of the present invention will become apparent from the following specification.

BRIEF DESCRIPTION OF THE DRAWINGS

FIG. 5 is a detail side view of foil sheets comprising the catalytic monolith of the warm-up catalytic converter according to the present invention.

FIG. 6A is a partly sectional top plan view of the warm-up catalytic converter according to the present invention, showing the exhaust gas path therethrough for a tube thereof in a closed state.

FIG. 6B is a broken-away end view of the warm-up catalytic converter seen along line 6B—6B in FIG. 6A, showing a vane thereof in a closed position.

FIG. 7A is a partly sectional top plan view of the warm-up catalytic converter according to the present invention, showing the exhaust gas path therethrough for a tube thereof in an open state.

FIG. 7B is a broken-away end view of the warm-up catalytic converter seen along line 7B—7B in FIG. 7A, showing a vane thereof in an open position.

FIG. 8 is a schematic of an example of components for effecting selective control over the open and closed states of the tube responsive to sensed temperature.

DETAILED DESCRIPTION OF THE PREFERRED EMBODIMENT

Figure 1:
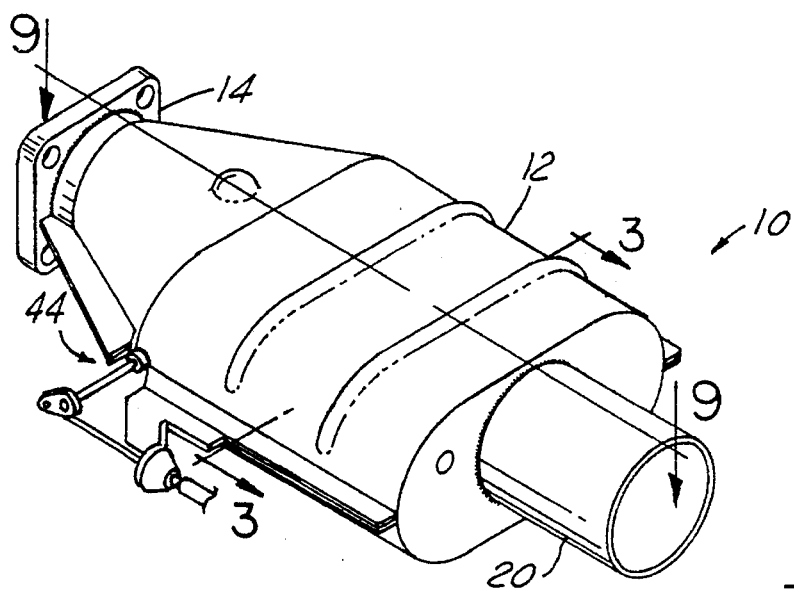
FIG. 1 is a perspective view of the warm-up catalytic converter according to the present invention.
Figure 2:
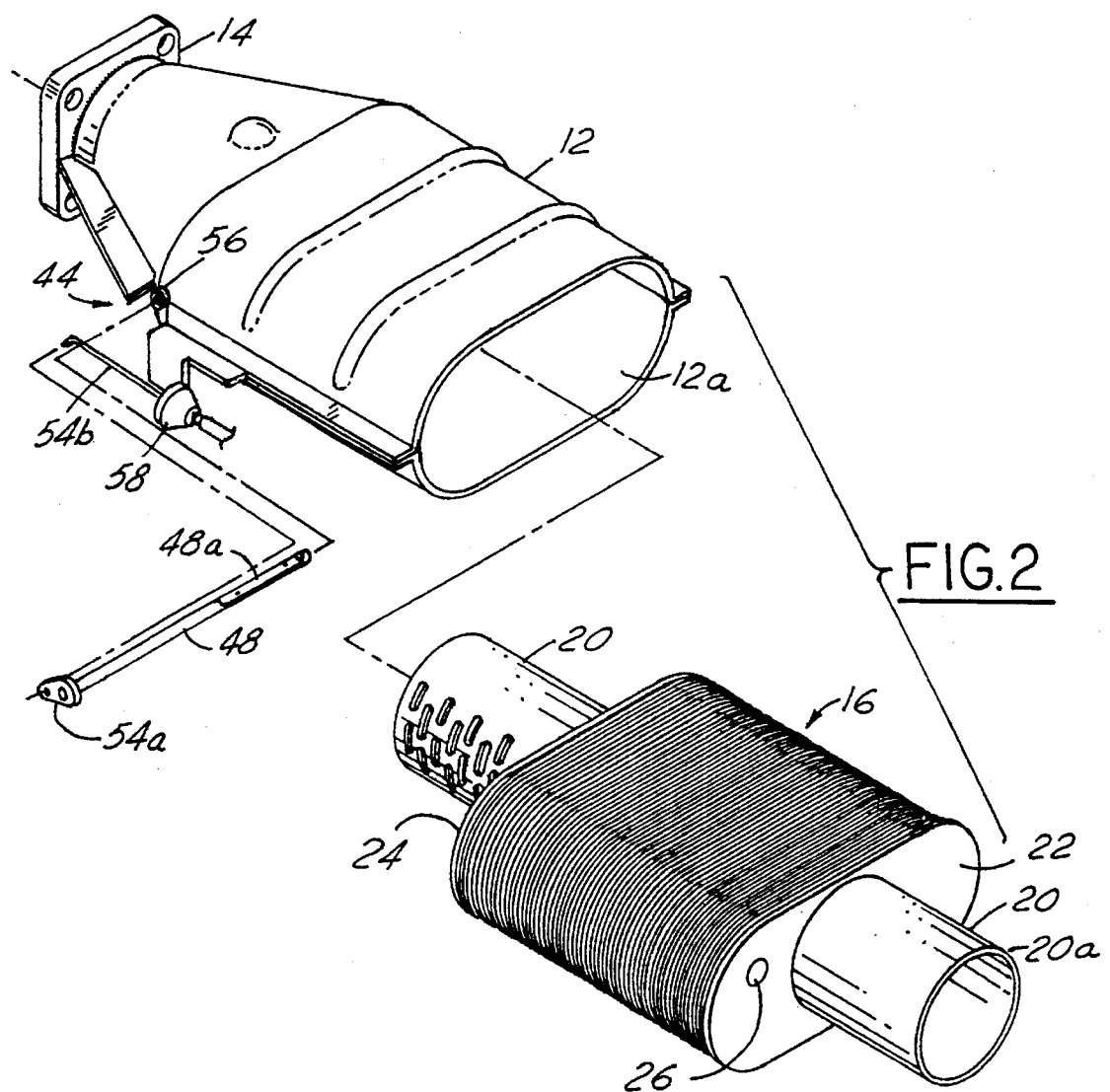
FIG. 2 is an exploded perspective view of the warm-up catalytic converter according to the present invention.
Figure 3:
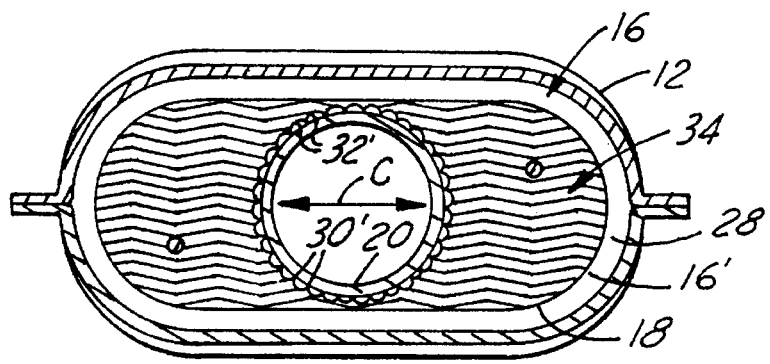
FIG. 3 is an end view of the warm-up catalytic converter according to the present invention, wherein the front plate thereof is absent for clarity of exposition as seen along line 3—3 of FIG. 1.

Referring now to the Drawing, FIGS. 1 and 2 show generally the warm-up catalytic converter 10 according to the present invention. A clam-shell enclosure 12 is provided having a downstream exhaust pipe fitting 14. The enclosure has a mouth 12a into which is placed a catalytic monolith 16 upstream of the fitting 14. The catalytic monolith 16 is composed of a number of herringbone corrugation patterned foil sheets 18, which are alternatingly reversed. Centrally situated with respect to the catalytic monolith 16 is a selectively perforated tube 20. A front plate 22 and a rear plate 24 are each sealingly affixed to the tube 20, such as by welding, wherein the catalytic monolith 16 is trapped therebetween. The tube 20 has an extension portion 20a for interfacing with the exhaust system upstream of the enclosure 12. The front plate 22 seals the mouth 12a of the enclosure 12. Preferably, the enclosure 12 and the catalytic monolith 16 are of an elliptical shape which defines a centerline axis C, as shown in FIG. 3. A pair of staking pins 26 pass through each of the front and rear plates 22, 24 and each of the foil sheets 18 so as to provide mutual alignment of the herringbone corrugation pattern of the foil sheets. A valve mechanism 44 provides selective switching between a radial flow mode and an axial flow mode, wherein catalytic reaction of exhaust gas occurs during the radial flow mode.

FIG. 3 shows the warm-up catalytic converter 10, wherein the front plate 22 is not shown in order to show that the outer periphery 16 of the catalytic monolith 16 is separated from the enclosure 12, which separation provides an outer passage 28 the purpose of which will become clear momentarily.

Figure 4:
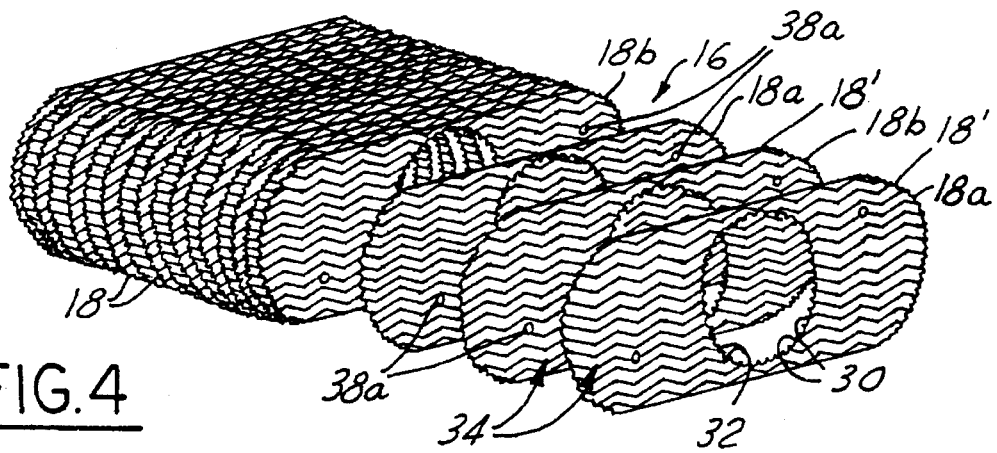
FIG. 4 is an exploded perspective view of the foil sheets comprising the catalytic monolith of the warm-up catalytic converter according to the present invention.

As shown by FIG. 4, the catalytic monolith 16 is provided by serially adjoining a large number of the foil sheets 18, wherein each of the foil sheets has a first surface and an opposite second surface and wherein the orientation of the first and second surfaces is serially alternated. Each of the foil sheets 18 has a central hole 30, the periphery of which is provided with a series of adjacent semi-circular notches 32. As an example of relative sizing, given a central hole of about 32 mm in radius, each notch may then be about 2 mm in radius and mutually spaced apart about 2 mm. When assembled into the catalytic monolith, the central hole 30 of each of the foil sheets 18 collectively become a central hole 30' (accompanied by notches 32') of the catalytic monolith, and likewise, the outer periphery 18' of each of the foil sheets 18 collectively become the outer periphery 16' of the catalytic monolith. In this regard, it is preferred for the outer periphery 18', 16' of the catalytic monolith 16 to be of a generally elliptical shape composed of curved portions on either side and flat opposing portions therebetween, and for the shape of the enclosure 12 to similarly therefollow, as shown by FIG. 3. As shown by FIG. 3, the aforesaid centerline axis C extends between the opposing curved portions.

Each foil sheet 18 has a herringbone corrugation pattern 34 impressed thereupon, composed of a series of herringbone pattern segments arranged in series parallel with respect to the centerline axis C, as shown by FIG. 3. The herringbone corrugation pattern 34, as shown best by FIG. 5, is composed of a series of peaks 34a and troughs 34b. An example of an acceptable corrugation height is about 1.158 mm, wherein the thickness of the foil sheet is about 0.051 mm. As shown by FIGS. 4 and 5, as the foil sheets 18 are assembled the orientation first and second surfaces thereof are alternately reversed so that the peaks 34a of mutually adjoining foil sheets 18a, 18b abut at each opposing herringbone segment. The abutment of the peaks 34a of mutually adjoining foil sheets 18a, 18b results in the creation of passageways 36, which have a maximum cross-section at the mutually facing troughs 34b. It is to be understood that the passageways 36 are zigzag in conformity with the herringbone corrugation pattern and are oriented radially with respect to the cylindrical axis A of the tube 20 (and generally parallel with respect to the centerline axis C). The vast majority of the passageways 36 extend between the central hole 30' and the outer periphery 16'. In this regard, catalytic reactions of exhaust gas occur in those passageways 36 which extend between the central hole 30' and the outer periphery 16' and which fluidically communicate with the first set 40a of first slots 40.

As an example of manufacture, a long roll of annealed metallic foil sheet has the contour of the central hole, notches and outer wall stamped out using a rotary die. The herringbone corrugation pattern is then stamped onto the foil sheets and the foil sheets are thereafter spray coated. The foil sheets may be entirely cut free of each other for assembly as shown in FIG. 4, or they may be linked together for assembly by folding one over the other. Alternatively, a large number of foil plates may be assembled and then cut by wire EDM to the proper dimensions. A noble (precious) metal catalytic material is then affixed to the surfaces of the foil sheets 18 by a conventional methodology known in the art, such as for example by being dipped into a bath of the noble (precious) metal catalytic material. A preferred material for the foil sheets is stainless steel and a preferred noble (precious) metal catalytic material is palladium.

In order to assure that each of the foil sheets 18 is properly aligned with each other foil sheet, staking holes 38a are provided in each of the foil sheets. As mentioned hereinabove, a staking pin 26 then passes through a staking hole 38b provided in each of the front and rear plates 22, 24 and alignably through each of the staking holes 38a of the foil sheets. In this regard, two widely separated staking holes 38a are shown in FIGS. 3, 4, 6a and 7a. The interaction between the staking holes 38a, 38b and the staking pins 26 assures that the peaks 34a of the herringbone corrugation pattern abut, thereby assuring the integrity of each of the passageways 36.

As shown in FIGS. 6 and 7, the tube 20 is located within the central hole 30' of the catalytic monolith, and extends outwardly on either side thereof. The tube 20 has two sets of staggered, elliptically shaped first and second slots 40, 42.

A first set 40a of first slots 40 is aligned with both the central hole 30' and the notches 32' so as to fluidically communicate with the passageways 36. In this regard, it is preferred for the placement, size and shape of each of the first slots 40 to be such as to permit at least two notches 32' to communicate therewith. It will be noted that the passageways 36 are oriented parallel with the centerline axis C (see FIG. 3) of the opposing curved ends of the catalytic monolith, consequently, the first slots 40 are placed in the tube 20 over a range extending about 60 degrees on either side of the centerline axis C. In this regard, it will be noted that the active passageways 36 are those which fluidically communicate with the first slots 40.

A valve mechanism 44 is partly located within the tube 20 adjacent to the rear plate 24 (just downstream thereof). The preferred valve mechanism 44 employs a butterfly-type valve having a vane 46 located within in the tube 20, which is pivotal with respect thereto via a pivot rod 48. An example thereof is provided by a fiat 48a on the pivot rod 48 (see FIG. 2) interfacing with the vane 46, and screws connecting them respectively together. The pivot rod 48 passes through a hole 50 in the enclosure 12 and through opposing holes 52 in the tube 20, and is pivotally secured at either end thereof by sleeves 56. Pivoting of the pivot rod 48 is effected by a crank linkage 54a, 54b connected with an actuator 58, such as for example a conventional vacuum operated plunger which operates off intake manifold vacuum via a hose connection. The actuator 58 causes the pivot rod 48 to rotate so that the vane 46 obstructingly closes the tube 20 when exhaust gas is to flow through the passageways 36, such as for example when a temperature sensor indicates the exhaust gas is too cold for a main catalytic converter (which forms part of the exhaust system downstream of the warm-up catalytic converter 10) to reach its light-off temperature. As understood from FIGS. 6B and 7B, the cross-section of the vane 46 is substantially equal to the inside cross-section of the tube 20 so that selective blockage of the tube can be effected by pivotal movement of the vane.

A snorkel 60 is provided in the enclosure 12 between the fitting 14 and both the rear plate 24 and the vane 46. The snorkel 60 fluidically communicates with the outer passage 28. The aforementioned second set 42a of second slots 42 are located at the snorkel 60.

Operation will now be detailed with reference being directed in particular to FIGS. 6A through 8.

When the engine is started, the actuator 58 causes the vane 46 to be pivoted so as to be perpendicularly oriented with respect to the cylindrical axis A of the tube, thereby occluding the tube 20, as shown by FIG. 6B. As shown in FIGS. 6A and 6B, upstream exhaust gas (indicated by arrows) comes into the tube is forced to follow a path through the first slots 40, pass into the notches 32', pass through the passageways 36, pass along the outer passage 28, enter into the snorkel 60, pass through the second slots 42 and then move downstream along the tube into the exhaust system components downstream of the warm-up catalytic converter 10. As the exhaust gas passes through the passageways, it catalytically reacts with the noble metal catalyst, thereby removing pollutants from the exhaust gas. Because the surface area provided by the passageways is very large in proportion to the size of the warm-up catalytic converter 10, and the dwell time of the exhaust gas therethrough is large, catalytic reactions can be expected even when the exhaust gas is relatively cool. Further, since the warm-up catalytic converter is designed to be operated during the initial period of engine operation, when the exhaust gas is too cold to bring the main catalytic converter to its light-off temperature, the use of highly catalytically active materials can be used, yet a long lifetime thereof can be expected. Further still, as the warm-up catalytic converter reacts with the exhaust gas, the exhaust gas is further heated, which increased heat is delivered to the main catalytic converter downstream.

Once the exhaust gas has reached a sufficiently high temperature that the main catalytic converter is at or near its light-off temperature, the actuator rotates the vane so that it is oriented parallel with respect to the cylindrical axis A of the tube, whereupon the tube is freely able to pass exhaust gas entirely therethrough, as shown by FIG. 7B. Consequently, exhaust gas will now by-pass the passageways and simply travel axially along the tube and thereupon pass into the exhaust system downstream of the warm-up catalytic converter 10.

An example for carrying-out the foregoing operation is schematically exemplified by FIG. 8. A temperature sensor 62 senses exhaust gas temperature and sends a signal indicative thereof to the engine control module (ECM) 64. The ECM 64 then connects the intake manifold vacuum 66 to the actuator 58 to cause the vane to be rotated to the position shown in FIGS. 6A, 6B, whereby the tube 20 is in a closed state so long as a predetermined temperature of the exhaust gas has not yet been reached. Upon the temperature sensor 62 sensing at least the predetermined temperature, the ECM 64 causes the vacuum 66 to be disconnected from the actuator 58, whereupon the actuator resiliently returns the vane to the position shown in FIGS. 7A, 7B whereby the tube is in an open state.

An advantage of the warm-up catalytic converter 10 is that it additionally serves as a resonator due to the inherent acoustic attenuation properties attendant to its structure as exhaust gas expands into the interior volume thereof.

In one test using a finite element method (ABAQUS) (axis symmetric method), the acoustic pressure distribution at 600 degrees Centigrade was measured in the range of 25 to 3,000 Hz. The acoustic pressure at the inlet and outlet were used in a fortran program to obtain acoustic transmission loss. Three basic configurations were studied: 30% porosity, 25% porosity and 20% porosity, wherein "porosity" is defined as the relative area of the slots to that of the tube in the portions of the tube sidewall whereat is situated the first set of first slots and the second set of second slots, and wherein the tube is the open state. It was concluded that a maximum of 19 db at 3,000 Hz acoustic attenuation is obtained for a warm-up catalytic converter according to the present invention having 20% porosity, and that for the three configurations, there is at least 8 db of acoustic attenuation in the range of 1,400 and 3,000 Hz. Accordingly, finite element modeling can be used to optimize a warm-up catalytic converter according to the present invention for a desired amount of acoustic transmission loss.

Figure 9:
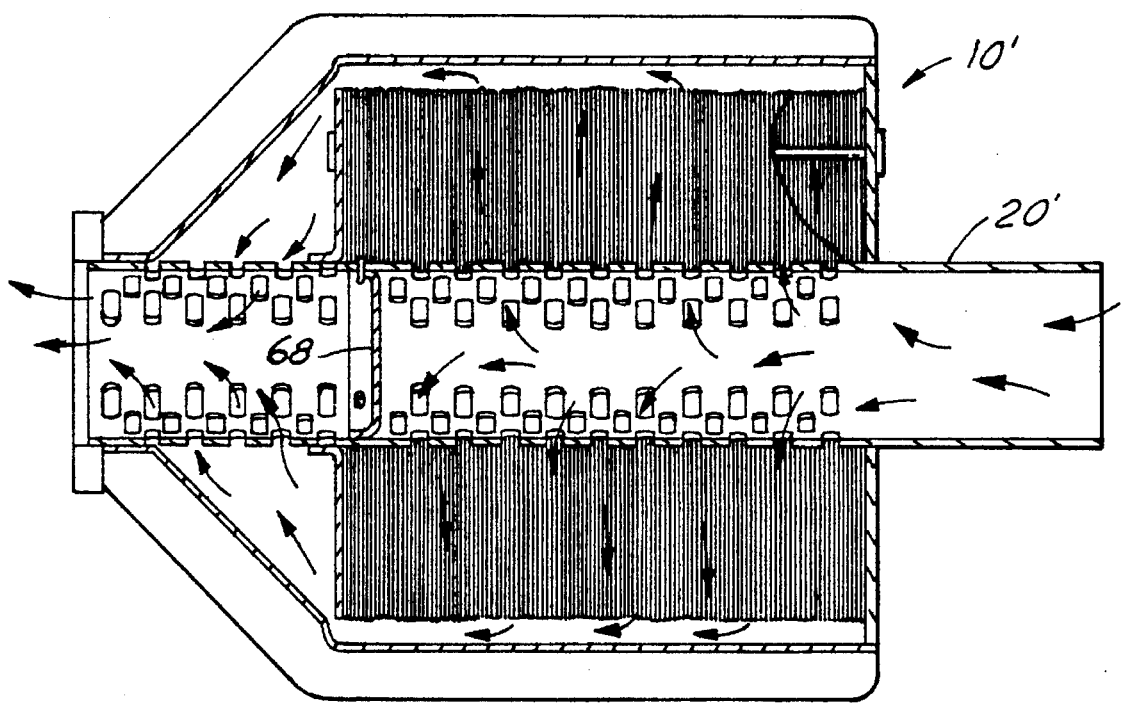
FIG. 9 is a partly sectional top plan view of the warm-up catalytic converter according to an alternative, plugged form of the present invention, showing the exhaust gas path therethrough as seen along line 9—9 of FIG. 1.

FIG. 9 depicts a variation of the warm-up catalytic converter according to the present invention. In this variation, the catalytic converter 10' is intended for full-time operation. Accordingly, since there is no need for a valve mechanism, there is now provided a plug 68 which is permanently affixed to the tube 20' such as by welding. Otherwise, all other components remain as disclosed hereinabove, so that a description thereof is obviated for those of ordinary skill in the art to appreciate and understand the structure and function of the catalytic converter 10'.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A valved radial flow catalytic converter for being connected with an exhaust system of an internal combustion engine, comprising:

an enclosure having an upstream end and a downstream end;

a tube extending between said upstream and downstream ends of said enclosure in sealing connection therewith, a first set of first slots being provided in said tube, a second set of second slots being provided in said tube spaced from said first set of first slots, said tube having a cylindrical axis;

a catalytic monolith connected with said tube, said catalytic monolith comprising a plurality of serially adjoining foil sheets, each foil sheet of said plurality of foil sheets having a first surface and an opposite second surface wherein each of said first and second surfaces has a selected catalytic material applied thereto, each said foil sheet having a central hole provided therein which collectively form a central hole of said catalytic monolith, each said foil sheet further an outer periphery which collectively form an outer periphery of said catalytic monolith, each said foil sheet being provided with a predetermined corrugation pattern wherein said predetermined corrugation pattern provides a plurality of passageways between mutually adjoining foil sheets, each passageway of said plurality of passageways being oriented in a direction substantially parallel to a centerline axis radial with respect to said cylindrical axis, a selected number of said plurality of passageways extending from said central hole of said catalytic monolith to said outer periphery of said catalytic monolith and fluidically communicating with said first set of first slots;

outer passage means for providing a gas flow passage from said outer periphery of said catalytic monolith to said second set of second slots; and means for selecting between a closed state of said tube and an open state of said tube, said selecting means being at a selected location inside said tube between said first set of first slots and said second set of second slots;

whereby when said tube is in said closed state exhaust gas passes into said tube, through said first set of first slots, along said selected number of said passageways whereupon the exhaust gas is catalytically reacted by said catalytic material, along said outer passage means, through said second set of second slots and out said tube.

2. The valved radial flow catalytic converter of claim 1, wherein said tube has an inside diameter; wherein said means for selecting comprises:

a vane having a cross-section substantially equal to said inside diameter;

a pivot rod connected with said vane, said pivot rod being pivotally connected with said tube; and means for pivoting said pivot rod to thereby cause said vane to move from a closed position whereat said vane is oriented in a plane substantially perpendicular to said cylindrical axis whereupon said tube is in said closed state, to an open position whereat said vane is oriented in a plane substantially parallel to said cylindrical axis whereupon said tube is in said open state.

3. The valved radial flow catalytic converter of claim 2, wherein said means for pivoting further comprises means for sensing temperature, wherein said pivoting of said vane is responsive to said temperature sensing means sensing temperature of exhaust gas within the exhaust system.

4. The valved radial flow catalytic converter of claim 1, wherein said central hole of said catalytic monolith is defined by a periphery, said periphery of said central hole being provided with a plurality of notches formed in each of said foil sheets.

5. The valved radial flow catalytic converter of claim 4, wherein said first slots are positioned in a mutually staggered arrangement; and wherein each said first slot fluidically communicates with at least two said notches.

6. The valved radial flow catalytic converter of claim 1, wherein said catalytic monolith further comprises front and rear plates, wherein said plurality of foil sheets are situated between said front and rear plates.

7. The valved radial flow catalytic converter of claim 6, wherein said first set of first slots is located whereat said centerline axis intersects said tube wherein said first set of first slots are arranged on said tube over a range of substantially 60 degrees either side of said centerline axis intersection.

8. The valved radial flow catalytic converter of claim 7, wherein said enclosure has a mouth, wherein said rear plate and said plurality of foil sheets are received into the enclosure through said mouth, and wherein said front plate sealingly interfaces with respect to said mouth.

9. The valved radial flow catalytic converter of claim 1, wherein said predetermined corrugation pattern is a herringbone corrugation pattern.

10. The valved radial flow catalytic converter of claim 9, wherein said first and second surfaces of said plurality of foil sheets have a serially alternating orientation wherein mutually adjoining foil sheets have respective first surfaces thereof facing each other and respective second surfaces thereof facing each other.

11. The valved radial flow catalytic converter of claim 1, wherein said tube has a porosity defined by the slots which provides acoustic attenuation of exhaust gas noise during passage between said inlet and said outlet when said tube is in said open state.

12. The valved radial flow catalytic converter of claim 11, wherein said porosity provides exhaust gas noise acoustic attenuation of at least eight db in a range of sound frequency between 1,400 and 3,000 Hz.

13. A valved radial flow catalytic converter for being connected with an exhaust system of an internal combustion engine, comprising:

an enclosure having an upstream end and a downstream end;

a tube extending between said upstream and downstream ends of said enclosure in sealing connection therewith, a first set of first slots being provided in said tube, a second set of second slots being provided in said tube spaced from said first set of first slots, said tube having a cylindrical axis and an inside diameter;

a catalytic monolith connected with said tube, said catalytic monolith comprising a plurality of serially adjoining foil sheets, each foil sheet of said plurality of foil sheets having a first surface and an opposite second surface wherein each of said first and second surfaces has a selected catalytic material applied thereto, each said foil sheet having a central hole provided therein which collectively form a central hole of said catalytic monolith, each said foil sheet further an outer periphery which collectively form an outer periphery of said catalytic monolith, each said foil sheet being provided with a herringbone corrugation pattern wherein said herringbone corrugation pattern provides a plurality of passageways between mutually adjoining foil sheets, each passageway of said plurality of passageways being oriented in a direction substantially parallel to a centerline axis radial with respect to said cylindrical axis, a selected number of said plurality of passageways extending from said central hole of said catalytic monolith to said outer periphery of said catalytic monolith and fluidically communicating with said first set of first slots;

outer passage means for providing a gas flow passage from said outer periphery of said catalytic monolith to said second set of second slots; and means for selecting between a closed state of said tube and an open state of said tube, said selecting means being at a selected location inside said tube between said first set of first slots and said second set of second slots, comprising:

a vane having a cross-section substantially equal to said inside diameter;

a pivot rod connected with said vane, said pivot rod being pivotally connected with said tube;

means for pivoting said pivot rod to thereby cause said vane to move from a closed position whereat said vane is oriented in a plane substantially perpendicular to said cylindrical axis whereupon said tube is in said closed state, to an open position whereat said vane is oriented in a plane substantially parallel to said cylindrical axis whereupon said tube is in said open state; and means for sensing temperature, wherein said pivoting of said vane is responsive to said temperature sensing means sensing temperature of exhaust gas within the exhaust system;

whereby when said tube is in said closed state exhaust gas passes into said tube, through said first set of first slots, along said selected number of said passageways whereupon the exhaust gas is catalytically reacted by said catalytic material, along said outer passage means, through said second set of second slots and out said tube.

14. The valved radial flow catalytic converter of claim 13, wherein said central hole of said catalytic monolith is defined by a periphery, said periphery of said central hole being provided with a plurality of notches formed in each of said foil sheets; and wherein said first slots are positioned in a mutually staggered arrangement; and wherein each said first slot fluidically communicates with at least two said notches.

15. The valved radial flow catalytic converter of claim 14, wherein said first and second surfaces of said plurality of foil sheets have a serially alternating orientation wherein mutually adjoining foil sheets have respective first surfaces thereof facing each other and respective second surfaces thereof facing each other.

16. The valved radial flow catalytic converter of claim 15, wherein said tube has a porosity defined by the slots which provides acoustic attenuation of exhaust gas noise during passage between said inlet and said outlet when said tube is in said open state.

17. A radial flow catalytic converter for being connected with an exhaust system of an internal combustion engine, comprising:

an enclosure having an upstream end and a downstream end;

a tube extending between said upstream and downstream ends of said enclosure in sealing connection therewith, a first set of first slots being provided in said tube, a second set of second slots being provided in said tube spaced from said first set of first slots, said tube having a cylindrical axis and an inside diameter;

a catalytic monolith connected with said tube, said catalytic monolith comprising a plurality of serially adjoining foil sheets, each foil sheet of said plurality of foil sheets having a first surface and an opposite second surface wherein each of said first and second surfaces has a selected catalytic material applied thereto, each said foil sheet having a central hole provided therein which collectively form a central hole of said catalytic monolith, each said foil sheet further an outer periphery which collectively form an outer periphery of said catalytic monolith, each said foil sheet being provided with a predetermined corrugation pattern wherein said predetermined corrugation pattern provides a plurality of passageways between mutually adjoining foil sheets, each passageway of said plurality of passageways being oriented in a direction substantially parallel to a centerline axis radial with respect to said cylindrical axis, a selected number of said plurality of passageways extending from said central hole of said catalytic monolith to said outer periphery of said catalytic monolith and fluidically communicating with said first set of first slots;

outer passage means for providing a gas flow passage from said outer periphery of said catalytic monolith to said second set of second slots; and plug means for closingly blocking said tube at a selected location inside said tube between said first set of first slots and said second set of second slots;

whereby exhaust gas passes into said tube, through said first set of first slots, along said selected number of said passageways whereupon the exhaust gas is catalytically reacted by said catalytic material, along said outer passage means, through said second set of second slots and out said tube.

18. The radial flow catalytic converter of claim 17, wherein said central hole of said catalytic monolith is defined by a periphery, said periphery of said central hole being provided with a plurality of notches formed in each of said foil sheets; and wherein said first slots are positioned in a mutually staggered arrangement; and wherein each said first slot fluidically communicates with at least two said notches.

19. The radial flow catalytic converter of claim 18, wherein said predetermined corrugation pattern is a herringbone corrugation pattern; and wherein said first and second surfaces of said plurality of foil sheets have a serially alternating orientation wherein mutually adjoining foil sheets have respective first surfaces thereof facing each other and respective second surfaces thereof facing each other.

20. The radial flow catalytic converter of claim 19, wherein said first set of first slots is located whereat said centerline axis intersects said tube wherein said first set of first slots are arranged on said tube over a range of substantially 60 degrees on either side of said centerline axis intersection.

* * * * *